J. M. BOTTUM.
MODE OF SECURING PINIONS AND STAFFS OF WATCHES IN LATHE
OR TURN BENCH CHUCKS.
No. 8,216. Patented July 15, 1851.
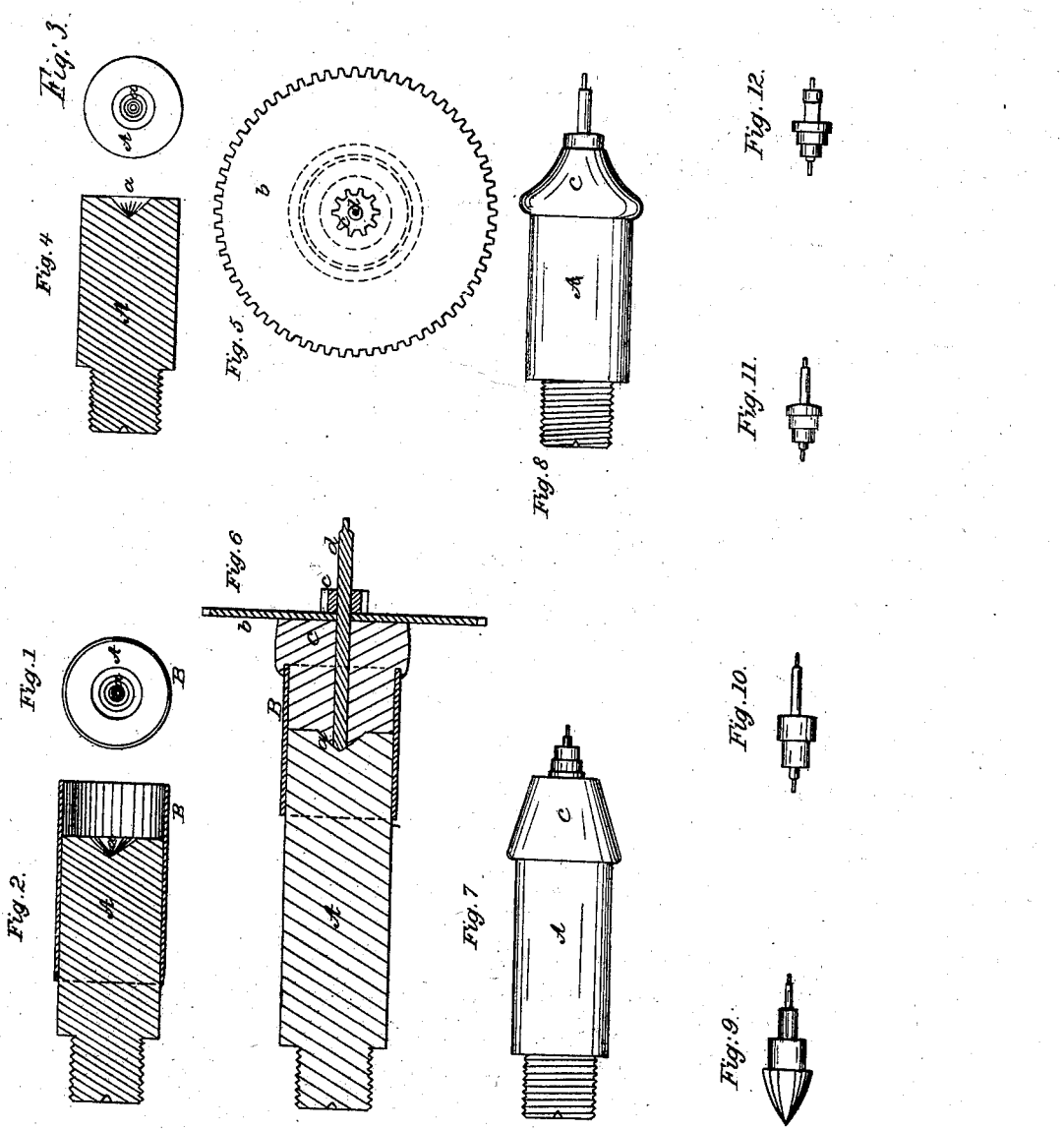

UNITED STATES PATENT OFFICE.

J. M. BOTTUM, OF NEW YORK, N. Y.

SECURING PINIONS, &c., OF WATCHES IN LATHES.

Specification forming part of Letters Patent No. 8,216, dated July 15, 1851; Reissued July 8, 1856, No. 375.

*To all whom it may concern:*

Be it known that I, J. M. BOTTUM, of the city, county, and State of New York, have invented a new and Improved Mode of Securing Pinions and Staffs of Watches in Lathes or Turn-Bench Chucks for the Purpose of Turning, Facing, Drilling, Grinding, or Polishing; and I do hereby declare that the following is a full, clear, and exact description of the same, reference being had to the accompanying drawings, on an enlarged scale, forming part of this specification, in which—

Figure 1, is an end view of a chuck with tube fitted to it, and Fig. 2, a longitudinal section of the same. Fig. 3, is an end view of a turning chuck and Fig. 4, a longitudinal section of the same. Figs. 5, and 6, are end view and longitudinal section of a chuck with tube having secured to it a wheel and pinion. Figs. 7 and 8, are side views of a chuck with either end of a balance staff secured to it. Figs. 9, 10, 11, and 12 are parts of a watch in detail being severally a duplex staff in part, a lever staff, anchor staff and cylinder, introduced for illustration as applicable to be secured for operating on by my improved mode about to be described.

The same letters of reference denote similar parts throughout each of the several figures.

The nature of my invention consists in employing a chuck, having a female center, and on which a tube may fit projecting somewhat over the end of the chuck, which screws into, or is connected with the turning mandrel in any or the ordinary way adopted for making it revolve, and the watch, staff or pinion required to be operated on, in its manufacture or repair, being secured to the chuck, so constructed, by the intervention of adhesive cement filling the female center of the chuck and end of tube projecting over it, whereby the usual mechanical means resorted to for holding the piece in the chuck, and sliding puppet, are dispensed with.

To enable others skilled in the art to make and use my invention, I will proceed to describe its construction and operation.

A, is a chuck of any desirable length, having a screw on one end, for securing it to the revolving mandrel of the lathe in the usual way, it should be made with a female center $a$, and is provided either with or without a surrounding tube B, tightly secured to it the end of which projects over the end of the chuck, forming thereby a cavity or box (as seen in Figs. 1, 2, and 6).

$b$, $c$, $d$, (Figs. 5 and 6) are wheel, pinion and pivot, of a watch shown in proper position with the chuck for operation; and C, (Figs. 6, 7, and 8,) is adhesive cement, of any suitable kind, for holding the piece being worked to the chuck.

The operation is as follows: The chuck A, is secured into the female screw of the revolving lathe mandril, as usual, which is set in motion by treadle or other ordinary way, and the piece to be turned or operated on, if a wheel pivot and pinion (such as seen in Figs. 5 and 6,) is secured to the chuck A, and tube B, Fig. 6, by setting one end of the pivot $d$, in the female center $a$, and surrounding it with adhesive cement C, which may be composed of material that by warming is plastic, and which when cooling becomes hard; (or any description of cement possessing suitable qualities may be used); the cement C, in Fig. 6, has presented a large adhering surface, by lapping round the pivot $d$, biting on the end of the chuck A, and interior of the projecting tube B, over the end, and on the outside of which it also laps, and adheres to the face of the wheel $b$, thereby forming a firm hold for the wheel, pinion and pivot $b$, $c$, $d$, to be turned or operated on, as they revolve together with the chuck A, and lathe mandrel to which the chuck is attached. Or the tube B, may be dispensed with and the cement made to hold the piece being worked by simply being made to lap around it and adhering to the end of the chuck A, (as seen in Figs. 7 and 8,) and in either of these or similar ways the part duplex staff Fig. 9, lever staff Fig. 10, anchor staff Fig. 11, cylinder Fig. 12, may be secured to the revolving chuck and the several lathe operations performed, in their manufacture or repair, which are now done, but by the adoption of my improved mode of securing the work to the chuck, through adhesive cement and use of a female center $a$, as described, a firm and large bearing hold is procured and a true center speedily obtained, whereby the ordinary mechanical arrangements for fixing and holding the workable piece in the turn bench or lathe are dispensed with, also the necessity of a second or sliding puppit center is obviated, as the pivot or piece being worked however small may thus be firmly held to the chuck and the time consumed in fixing it by the ordinary mechanical arrangements saved, as well as expense and intricacy of management; also incurring less liability to breakage, where the pivot or pinion is very small, by use of a second center. Likewise the pivot or pinion thus held may be operated on by a graver or appropriate tool, held in the one hand, instead of the usual drill-bow, which will leave the other hand at liberty for holding a powerful magnifying glass, at any suitable distance, in place of spectacles as now employed whereby the arrangements used, both hands are engaged in operating the pivot.

What I claim as my invention and desire to secure by Letters Patent is—

The employment of adhesive cement for securing staffs and pinions of watches or time pieces for lathe operation, in combination with a chuck A, with a sliding tube B, and a female center $a$, as described and set forth or in any manner substantially the same.

JAMES M. BOTTUM.

Witnesses:
O. D. MUNN,
S. H. WALES.

[FIRST PRINTED 1913.]